(12) United States Patent
Daraie et al.

(10) Patent No.: US 8,740,540 B2
(45) Date of Patent: Jun. 3, 2014

(54) FORK APPARATUS FOR HANDLING COTTON BALES

(75) Inventors: Shadruz Daraie, Copley, OH (US); Robert Sikorski, Tallmadge, OH (US)

(73) Assignee: Paladin Brands Group, Inc., Oak Brook, IL (US)

( * ) Notice: Subject to any disclaimer, the term of this patent is extended or adjusted under 35 U.S.C. 154(b) by 812 days.

(21) Appl. No.: 12/435,764

(22) Filed: May 5, 2009

(65) Prior Publication Data
US 2009/0297320 A1  Dec. 3, 2009

Related U.S. Application Data

(60) Provisional application No. 61/051,501, filed on May 8, 2008.

(51) Int. Cl.
*B66C 3/00* (2006.01)
(52) U.S. Cl.
USPC ......................................................... 414/785
(58) Field of Classification Search
CPC ..... A01D 51/005; A01D 87/12; A01D 90/02; A01D 87/127; B66F 9/06; B66F 9/08; B66F 9/10; B66F 9/14; B66F 9/18; B66F 9/143; B66F 9/122; B66F 9/142; B66F 9/145; B66F 9/144; B66F 17/003; B66C 1/54; B66C 1/66
USPC ......... 414/338, 427, 428, 429, 433, 490, 603, 414/758, 785, 910, 911, 631, 667; 187/223, 187/237; 294/61, 93
See application file for complete search history.

(56) References Cited

U.S. PATENT DOCUMENTS

| | | | |
|---|---|---|---|
| 2,706,061 A | 4/1955 | Ehmann | |
| 2,775,359 A | 12/1956 | Carpenter | |
| 2,797,004 A * | 6/1957 | Miller | 414/427 |
| 3,241,695 A | 3/1966 | Bishop | |
| 4,161,253 A | 7/1979 | Ralston et al. | |

(Continued)

FOREIGN PATENT DOCUMENTS

| | | |
|---|---|---|
| ES | 2 101 662 | 7/1997 |
| GB | 2 101 882 | 1/1983 |
| WO | WO 2006/118469 A1 | 11/2006 |

OTHER PUBLICATIONS

International Preliminary Report on Patentability mailed Nov. 18, 2010 for International application No. PCT/US2009/042851.

(Continued)

*Primary Examiner* — Saul Rodriguez
*Assistant Examiner* — Glenn Myers
(74) *Attorney, Agent, or Firm* — Fay Sharpe LLP (57) ABSTRACT

A fork apparatus includes a body adapted to be operatively connected to an associated loader machine. First and second forks include respective first and second fork mounting portions connected to the body and respective first and second fork working portions that project outwardly away from the body. A first powered roller device is connected to the first fork and includes a first roller that rotates about a first working portion axis. A first roller actuator selectively rotates the first roller about the first working portion axis. A second powered roller device is connected to the second fork and includes a second roller that rotates about the second working portion axis that is parallel to the first working portion axis. A second roller actuator selectively rotates the second roller about the second working portion axis.

2 Claims, 7 Drawing Sheets

(56) References Cited

U.S. PATENT DOCUMENTS

| | | | |
|---|---|---|---|
| 4,676,289 A | 6/1987 | Yi Su | |
| 4,794,671 A | 1/1989 | Goldman | |
| 4,821,486 A | 4/1989 | Oiestad | |
| 4,854,809 A * | 8/1989 | Rhodes | 414/685 |
| 5,318,399 A * | 6/1994 | Marom | 414/412 |
| 5,327,706 A | 7/1994 | Skole | |
| 5,362,194 A * | 11/1994 | Kassebaum | 414/427 |
| 6,901,732 B2 | 6/2005 | Bares et al. | |
| 6,941,740 B2 | 9/2005 | Fox et al. | |
| 6,969,225 B2 * | 11/2005 | Mensch | 414/685 |
| 7,008,167 B2 * | 3/2006 | Henning | 414/667 |
| 7,165,928 B2 | 1/2007 | Haverdink et al. | |
| 7,182,568 B2 | 2/2007 | McGinnes | |
| 7,591,628 B2 * | 9/2009 | Noonan et al. | 414/607 |
| 2003/0019345 A1 | 1/2003 | Platon et al. | |
| 2003/0089081 A1 | 5/2003 | Platon | |
| 2005/0105990 A1 | 5/2005 | Maclay | |
| 2005/0200457 A1 | 9/2005 | Bridgelall et al. | |
| 2005/0207877 A1 | 9/2005 | Haverdink et al. | |
| 2007/0181469 A1 | 8/2007 | Stover | |
| 2008/0063503 A1 | 3/2008 | Garrett | |
| 2010/0003118 A1 | 1/2010 | Noonan et al. | |
| 2010/0111647 A1 | 5/2010 | Noonan et al. | |

OTHER PUBLICATIONS

International Search Report mailed Jun. 22, 2009 for International application No. PCT/US2009/042851.

Written Opinion mailed Jun. 22, 2009 for International application No. PCT/US2009/042851.

* cited by examiner

FORK APPARATUS FOR HANDLING COTTON BALES

CROSS-REFERENCE TO RELATED APPLICATION

This application claims priority from and benefit of the filing date of U.S. provisional application Ser. No. 61/051,501 filed May 8, 2008, and the entire disclosure of said provisional application Ser. No. 61/051,501 is hereby expressly incorporated by reference into the present specification.

BACKGROUND

A need has been identified for an improved fork apparatus for handling large cylindrical bales or modules of cotton using a front-end loader or other loader machine. The cotton bales/modules are typically covered in a polymeric wrap. Known devices have not allowed for optimal handling of the wrapped bales/modules and have also been deemed deficient for unloading the cotton and for removing and handling the polymeric wrap.

SUMMARY

In accordance with one aspect of the present development a fork apparatus includes a body adapted to be operatively connected to an associated loader machine. First and second forks include respective first and second fork mounting portions connected to the body and respective first and second fork working portions that project outwardly away from the body. A first powered roller device is connected to the first fork and includes a first roller that rotates about a first working portion axis. A first roller actuator selectively rotates the first roller about the first working portion axis. A second powered roller device is connected to the second fork and includes a second roller that rotates about the second working portion axis that is parallel to the first working portion axis. A second roller actuator selectively rotates the second roller about the second working portion axis.

In accordance with another aspect of the present development, a fork apparatus includes a body adapted to be operatively connected to an associated loader machine. First and second forks are connected to the body and include respective first and second fork mounting portions connected to the body and respective first and second fork working portions that project outwardly away from the body. The first fork working portion includes a first roller that rotates about a first axis and the second fork working portion includes a second roller that rotates a second axis. A first actuator selectively rotates the first roller about the first axis and a second actuator selectively rotates the second roller about the second axis.

DETAILED DESCRIPTION

Figure 1:
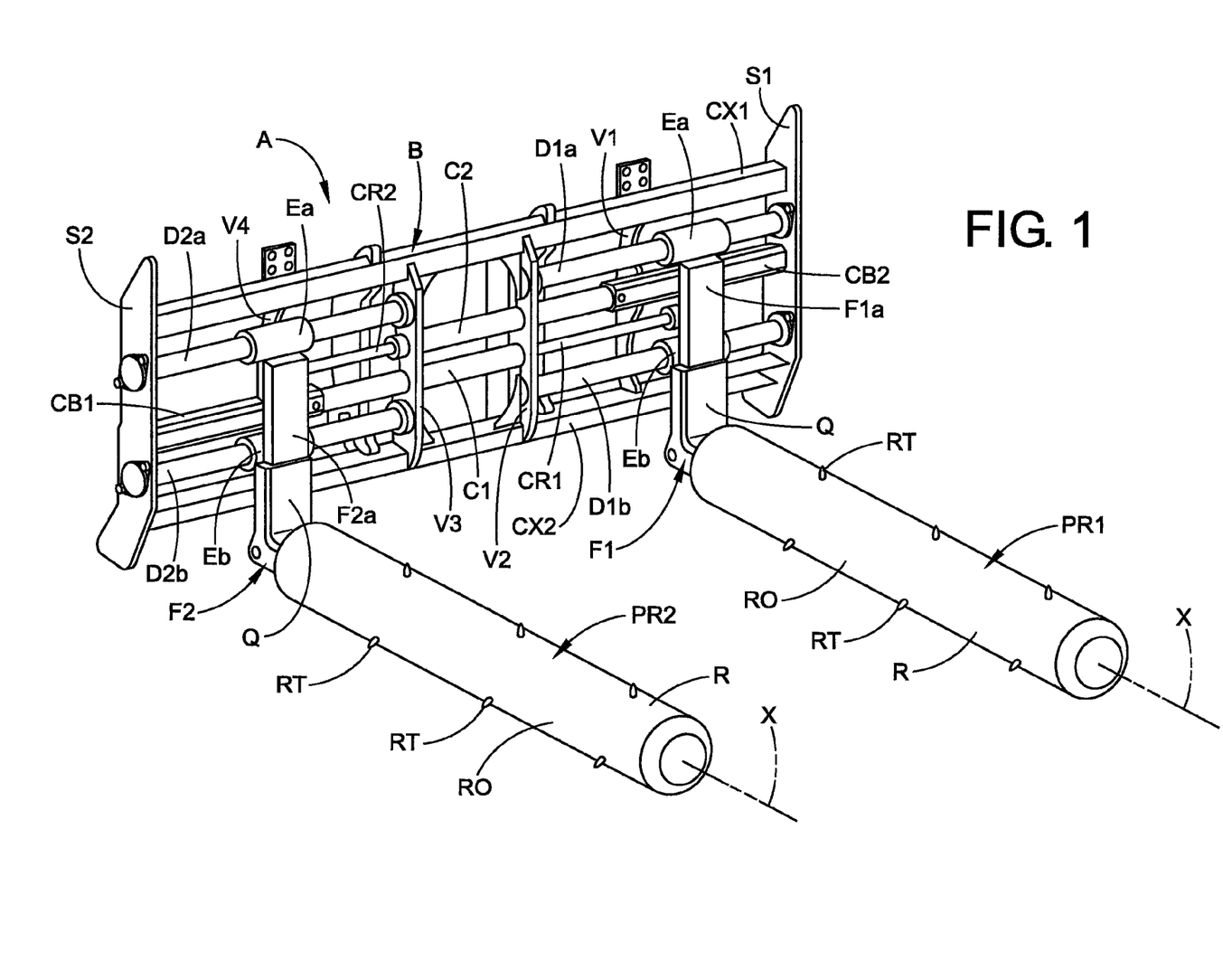
FIGS. 1 and 2 are front and rear isometric views, respectively, of a fork apparatus in accordance with the present development.
Figure 2:
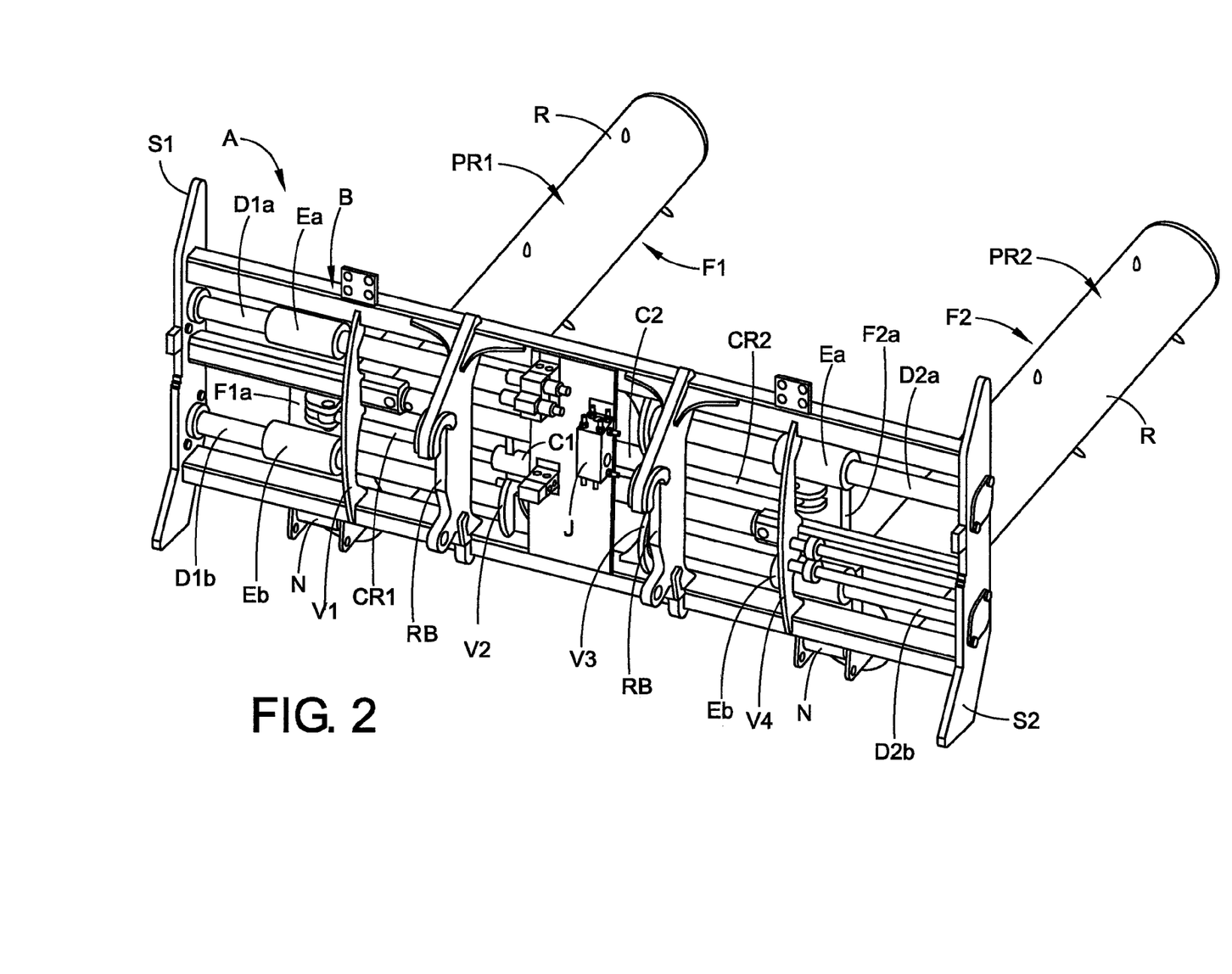
Figure 4:
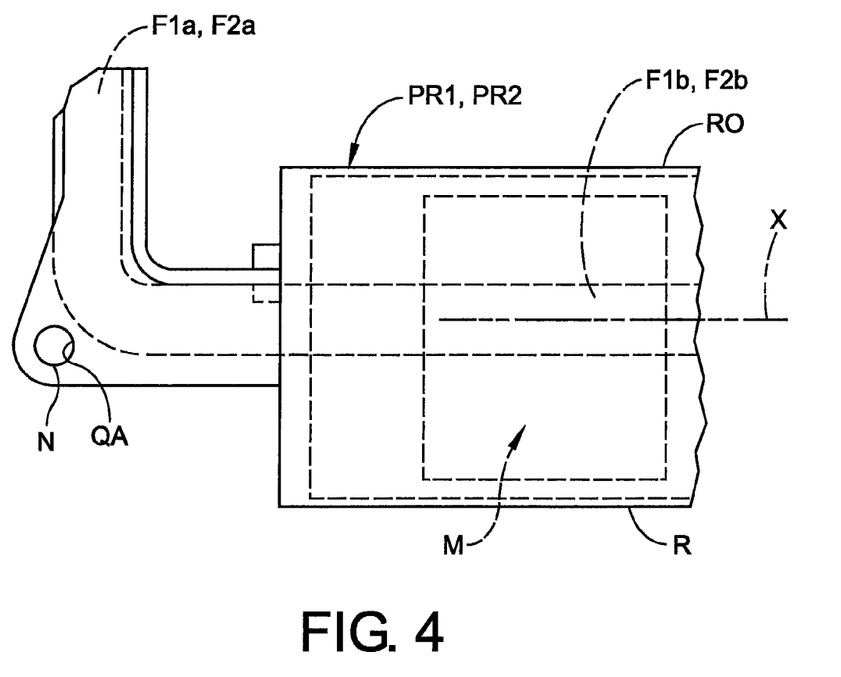
FIG. 4 is a partial view of the powered roller device.

FIGS. 1 and 2 are front and rear isometric views, respectively, of a fork apparatus A for handling cotton bales or modules or the like, e.g., large cylindrical cotton bales wrapped in a polymeric film. The fork apparatus A comprises a main frame or body B defined from steel or other metal, and first and second steel or other metal tines or forks F1,F2 connected to the body B and adapted to move laterally inward toward each other and outward away from each other to adjust the lateral spacing between the forks F1,F2 in order to facilitate pick-up and drop-off of a cotton bale and/or to accommodate different sized bales. Referring also to FIG. 4, the first and second forks F1,F2 include respective first and second fork mounting portions F1a,F2a by which the forks are connected to the body B, and include respective first and second fork working portions or tines F1b,F2b generally perpendicular to the respective mounting portions F1a,F2a and projecting outwardly away from base B and adapted to engaging cotton bales or the like (the mounting and working portions of the forks are shown in broken lines in FIG. 4 because they are covered by a powered roller device PR as described below).

The body B is adapted to be carried by a loader machine such as a front-end loader or the like (hereinafter "loader" or "loader machine") and is connected to the loader by suitable means such as a pin-on connection or, as shown, by a quick-coupler apparatus. In the illustrated embodiment, the body B comprises a pair of quick-coupler ribs RB (FIG. 2) that are adapted to be mated with and secured to a corresponding quick-coupler master that is pivotally pinned to the associated loader. The body B further comprises first and second lateral side ribs or walls S1,S2, upper and lower cross-bars CX1, CX2 that extend between the side walls S1,S2, and multiple intermediate vertical ribs V1,V2,V3,V4 that extend between and interconnect the upper and lower cross-bars CX1,CX2. The exact structure of the body B can vary without departing from the overall scope and intent of the present development.

The body B further comprises: (i) a first set of upper and lower fork rods D1a,D1b (collectively "D1") arranged parallel to each other and that extend horizontally between the first sidewall S1 and the intermediate rib V2; and, (ii) a second set of upper and lower fork rods D2a,D2b (collectively "D2") arranged parallel to each other and that extend horizontally between the second sidewall S2 and the intermediate rib V3. As is described in further detail below, the first and second sets of fork rods D1,D2 respectively support the first and second forks F1,F2 for horizontal sliding movement thereon required for the above-described lateral movement of the forks F1,F2 toward and away from each other.

Figure 3:
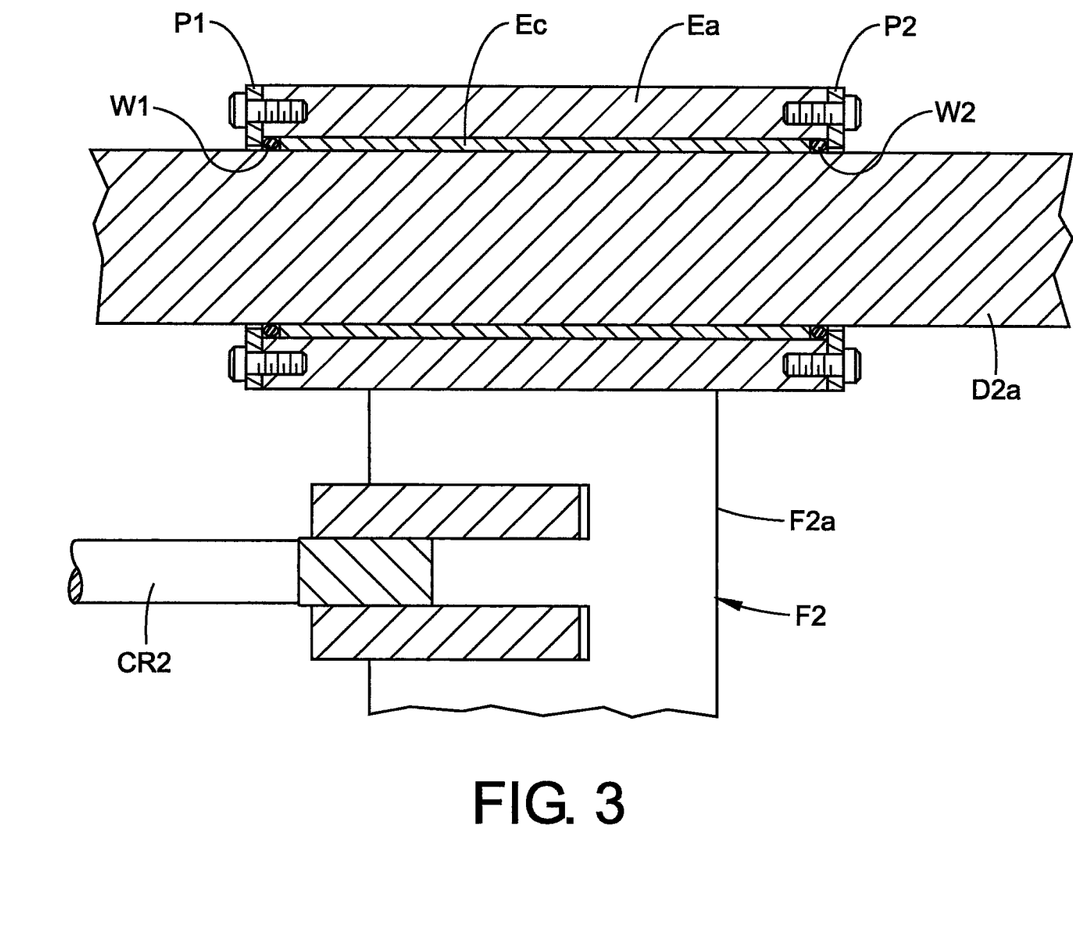
FIG. 3 is a partial section view showing connection of the forks to the base.

More particularly, the mounting portion F1a,F2a of each fork includes first and second eyes Ea,Eb connected thereto by welding or otherwise. The eyes Ea,Eb are respectively received on the upper and lower fork rods D1a,D1b (for the fork F1) and D2a,D2b (for the fork F2) with a close, sliding fit. The fork rods D1,D2 are preferably cylindrical and the eyes Ea,Eb preferably comprise a correspondingly cylindrical inner diameter. FIG. 3 shows a cross-section of the eye Ea for the fork F2, wherein it can be seen that the eye comprises an internal cylindrical bronze bushing Ec that is closely slidably received on the fork rod D2a. The opposite open ends of the eye Ea are sealed by respective caps P1,P2 that are fastened to the eye Ea. Wiper seals W1,W2 preferably encircle the fork rod D2a at each end of the eye Ea to prevent ingress of dirt. The wiper seals W1,W2 are held by or at least retained in the illustrated operative position by the respective cap P1,P2. The eyes Ea,Eb of the fork F1 are connected to the fork rods D1a,D1b in the manner shown in FIG. 3, and the eyes Ea,Eb of the fork F2 are connected to the fork rods D2a,D2b also in the manner shown in FIG. 3.

The fork apparatus A further comprises at least one actuator such as a hydraulic cylinder or other actuator for selectively sliding the first and second forks F1,F2 laterally inward and outward toward and away from each other on the fork rods D1,D2 to control the lateral spacing between the forks F1,F2 and/or to shift the lateral position of both forks F1,F2 relative to the base B while keeping the lateral spacing distance between the forks F1,F2 constant. In the illustrated embodiment, the fork apparatus A comprises first and second actuators C1,C2 connected to the body B and operatively connected to the first and second forks F1,F2, respectively. The cylinder C1 is connected to the body B and comprises a rod CR1 that is operatively connected to the mounting portion F1a of the first fork F1. Likewise, the cylinder C2 is connected to the body B and comprises a rod CR2 that is operatively connected to the mounting portion F2a of the second fork F2 (see also FIG. 3). Extension and retraction of the cylinder rods CR1,CR2 moves the forks F1,F2 outwardly away from each other and inwardly toward each other, respectively. The cylinders C1,C2 are configured to be actuated in a synchronized symmetrical manner using a hydraulic flow divider which can be a gear type or spool type. When the cylinders C1,C2 are actuated, the hydraulic flow to the cylinders C1,C2 passes through the divider and each cylinder C1,C2 receives the same amount of hydraulic fluid pressure/flow for equal displacement of their respective cylinder rods CR1,CR2. However, the cylinders C1,C2 can also be configured to operate independently of each other or can be configured to allow for independent movement of the first fork F1 or second fork F2 without corresponding movement of the other fork. The cylinders C1,C2 can be replaced by other actuators such as one or more hydraulic jackscrews or electric actuators or other suitable means for selectively moving the forks inward and outward relative to each other. In the embodiment of FIGS. 1 and 2, the cylinders C1,C2 are horizontally supported parallel to each other between intermediate ribs V2,V3 and include base portions CB1,CB2 connected to the second and first sidewalls S2,S1, respectively. In an alternative embodiment, one fork F1,F2 can be fixed in position relative to the body B while the other fork F1,F2 is movable laterally as described.

To handle large, cylindrical cotton bales or other loads, at least one of the forks, and preferably both forks F1,F2 includes a powered roller device PR connected thereto or defined as a part thereof. Referring also to FIG. 4 which generally related to both forks F1,F2, in the illustrated embodiment, at least the working portion F1b,F2b of each fork includes a powered roller device PR (PR1 for the first fork F1 and PR2 for the second fork F2) releasably connected thereto. Each powered roller PR comprises a mounting base or mounting sleeve Q that is received on the fork F1,F2, with part of the sleeve Q in contact with and/or covering the fork mounting portion F1a,F2a and part of the sleeve Q in contact with and/or covering the fork working portion F1b,F2b. The sleeve Q is defined by a metal channel or other structure. The powered roller PR is operatively installed on a fork F1,F2 by installing the sleeve Q on the fork and installing a pin or other fastener N into aligned apertures QA defined in opposite side walls of the sleeve Q such that the pin N captures the sleeve Q to the fork F1,F2 and prevents separation of the sleeve Q from the fork.

Figure 4A:
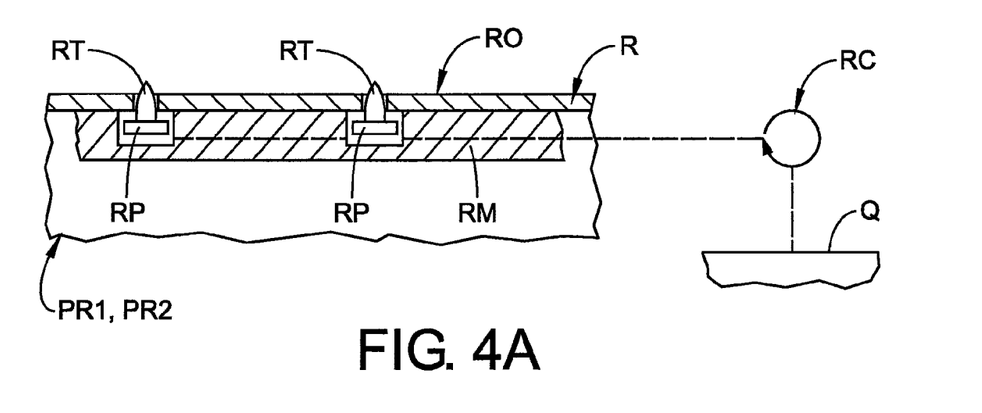
FIG. 4A partially shows a section of the powered roller device including a hydraulic manifold for controlling the position of the studs.

Each powered roller device PR1,PR2 further comprises a roller R supported for bi-directional rotation about the sleeve Q. When the powered roller is operatively installed on a fork F1,F2, the roller R extends substantially coextensive with the fork working portion F1b,F2b, i.e., from a roller inner end located adjacent the fork mounting portion F1a,F2a to a roller outer end located adjacent the distal tip of the fork working portion F1b,F2b spaced from the fork mounting portion F1a, F2a and base B. When the powered roller PR1,PR2 is operatively mounted to a respective fork F1,F2, the roller R thereof is supported for rotation about the sleeve Q, coaxial relative to the longitudinal axis X of the respective fork working portion F1b, F2b. Each powered roller device PR1,PR2 comprises a hydraulic motor or other hydraulic or electric or other powered actuator M connected to the mounting sleeve Q and operably engaged with the roller R for selectively rotating the roller R about the axis X. The roller R is defined from any suitable material such as a polymeric material or a metal such as steel or aluminum or the like. As shown in FIGS. 1 and 2, the roller R preferably includes a plurality of radially projecting studs RT that are fixed in position or that are selectively radially extensible and retractable relative to the outer surface RO of the roller (e.g., by a hydraulically operated cam or other actuator) so that the roller R can have a smooth cylindrical outer surface when the studs RT are retracted and a studded outer surface when the studs RT are extended. In one example, as shown in FIG. 4A, a hydraulic manifold RM is connected to rotate with the roller R and comprises a plurality of reciprocal pistons RP that are selectively extensible and retractable by force of hydraulic or other fluid pressure. Each stud RT is connected to one of the pistons RP and moves therewith. Hydraulic fluid is supplied to/from the manifold RM through a rotatable (swivel) coupling RC located between the manifold RM and the mounting sleeve Q to which the roller R is connected.

Referring again specifically to FIG. 2, the fork assembly A comprises suitable means for controlling the fork actuator cylinders C1,C2 and the powered rollers PR. Hydraulic fluid is fed to the fork assembly A from the associated loader machine to which the fork assembly is operatively connected using known arrangements of hoses, valves, manifolds, and the like. In the illustrated embodiment the forks F1,F2 are adapted to move laterally inward and outward relative to each other in a synchronized manner, in which case a flow divider J such as a gear type flow divider is connected to the body B and used to ensure that hydraulic fluid flows equally to/from the cylinders C1,C2. Other hydraulic valves HV are connected to the body B and used to control the flow of hydraulic fluid to the cylinders C1,C2 and the powered roller devices PR.

In use, the powered roller devices PR1,PR2 are connected the respective forks F1,F2 and a cylindrical cotton bale is carried on the rollers R of the powered roller devices PR1, PR2. The lateral spacing between the rollers R is adjusted as necessary to pick-up the cotton bale, carry the cotton bale and to unload the cotton bale as desired. Such cotton bales are typically wrapped in a polymeric wrap. To unload the cotton from the bale, the polymeric bale wrap is manually slit between the rollers, parallel thereto. After the polymeric bale wrap is slit, the forks F1,F2 (carrying the powered rollers PR1,PR2) are spread apart to allow the cotton in the bale to be released, and one or both of the powered rollers is/are actuated to rotate the roller R thereof to cause the polymeric bale wrap to be wrapped around the roller R, preferably with the aid of the extended studs RT so that the polymeric bale wrap is not released with the load of cotton from the bale. When both powered roller devices PR1,PR2 are activated to rotate their respective rollers R during take-up of the bale wrap, the rollers R are counter-rotated relative to each other (with the upper portions thereof rotating inward toward each other). After release of the cotton from the unwrapped bale, the polymeric bale wrap is removed from the roller(s) R manually and/or by reversing the roller(s) R.

In an alternative embodiment, the roller R of each powered roller device PR1,PR2 can simply be a non-powered idler roller that rotates freely in either direction.

Figure 5:
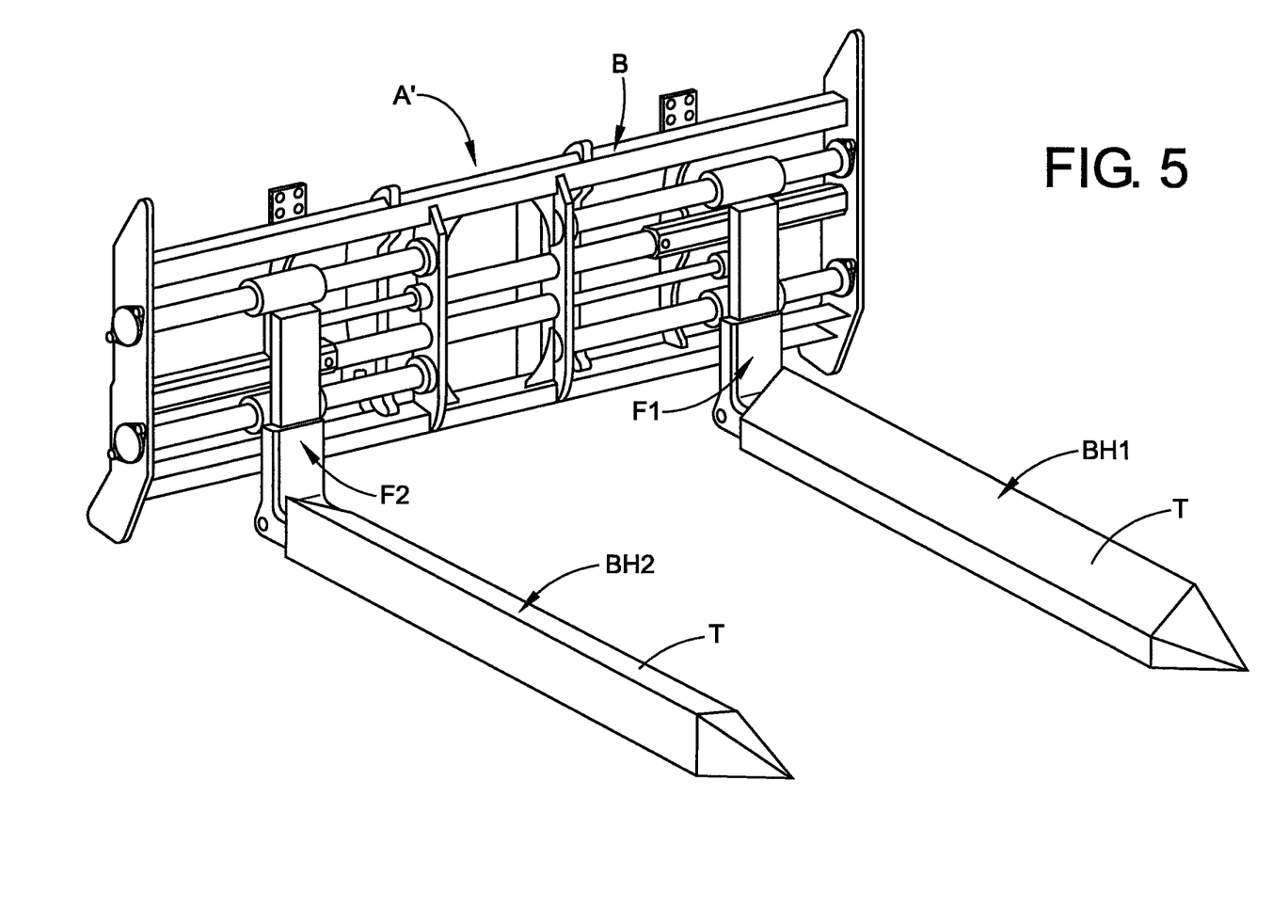
FIG. 5 shows an alternative embodiment of a fork apparatus in accordance with another aspect of the present development.

An alternative embodiment of the fork apparatus is shown at A' in FIG. 5. Except as otherwise shown and/or described herein, the fork apparatus A' is identical to the fork apparatus A. The fork apparatus A' does not include powered roller devices PR1,PR2. Instead, first and second bale handling sleeves BH1,BH2 are installed on the forks F1,F2, respectively. The bale handling sleeves BH1,BH2 are identical to the powered rollers PR1,PR2 and install in the same manner, except that the bale handling sleeves BH1,BH2 include fixed sleeves T in place of the rotatable rollers R. The fixed sleeves T can have any desired shape, such as cylindrical, polygonal or other.

Figure 6:
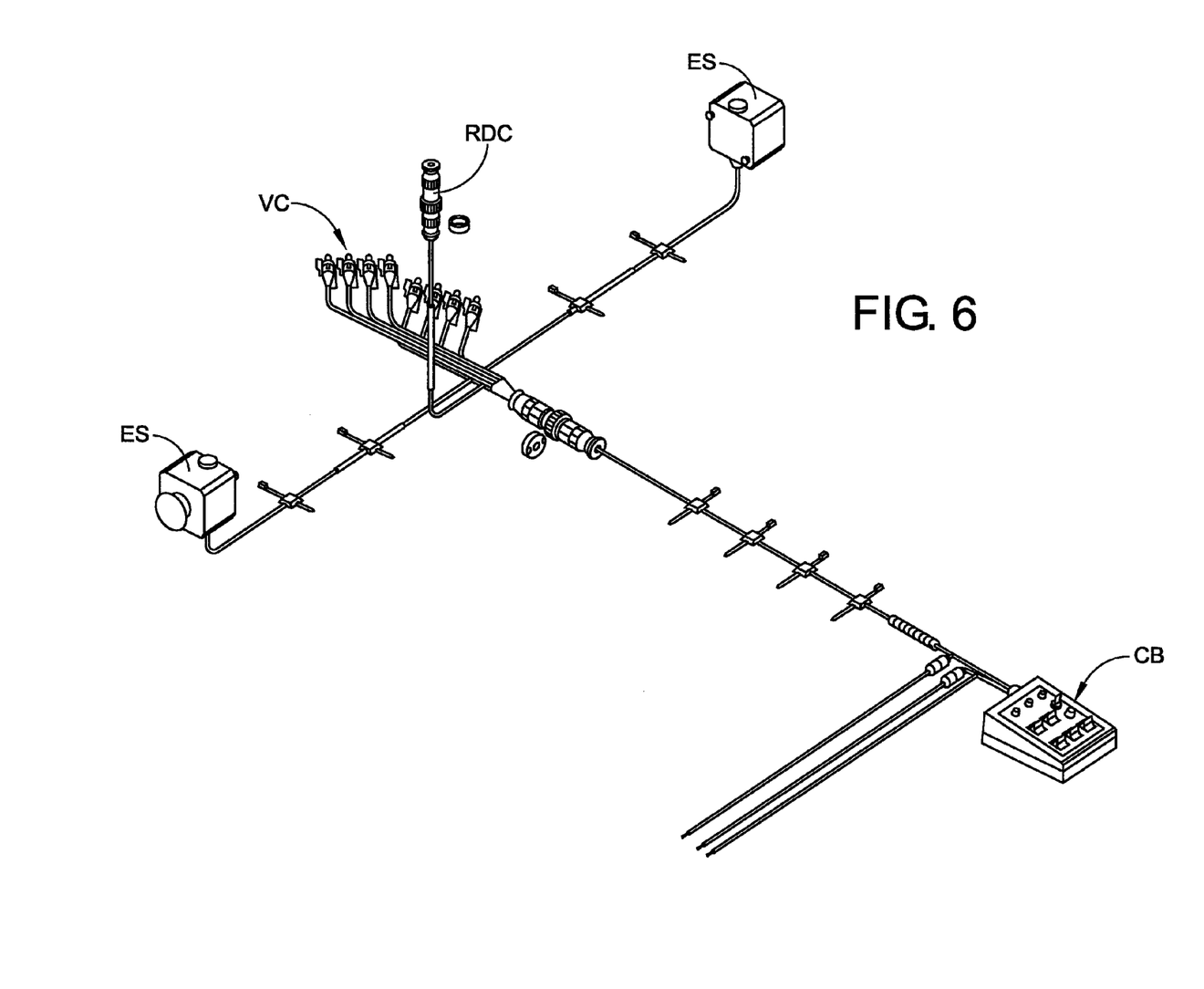
FIG. 6 shows one example of an electrical system for controlling a fork apparatus in accordance with the present development.

FIG. 6 shows one example of an electrical system for controlling the fork apparatus A,A'. A control box CB is mounted in the operator's cab of the loader to which the fork apparatus A,A' is operably connected for use by an operator to control all aspects of the fork apparatus A,A'. The control box CB, includes relays, microprocessors, switches, and/or other electrical devices and circuits for receiving electrical input signals from and providing electrical output signals to the fork apparatus A,A' to control all operational aspects thereof. For example, a plurality of valve connectors VC are provided for electrical connection to the hydraulic valves HV of the fork apparatus A,A' to control the operation thereof (and thus control flow of hydraulic fluid) via signals sent from the control box CB. The fork apparatus A,A' can include one or more emergency stop switches/sensors ES connected to the sidewalls S1,S2 or other part of body B as desired. Activation of the emergency stop switch/sensor ES will cut all electrical, hydraulic or other power to the apparatus A,A' to halt any lateral inward or outward sliding movement of the forks F1,F2 and to halt any activation of the powered roller devices PR1,PR2. The fork apparatus A,A' can further include one or more radio frequency identification (RFID) transceivers RD (FIG. 7) connected to the body B or elsewhere for sensing any RFID tag on the cotton bale carried by the forks F1,F2, and an RFID connector RDC is provided for an electrical interface with the control box CB.

Figure 7:
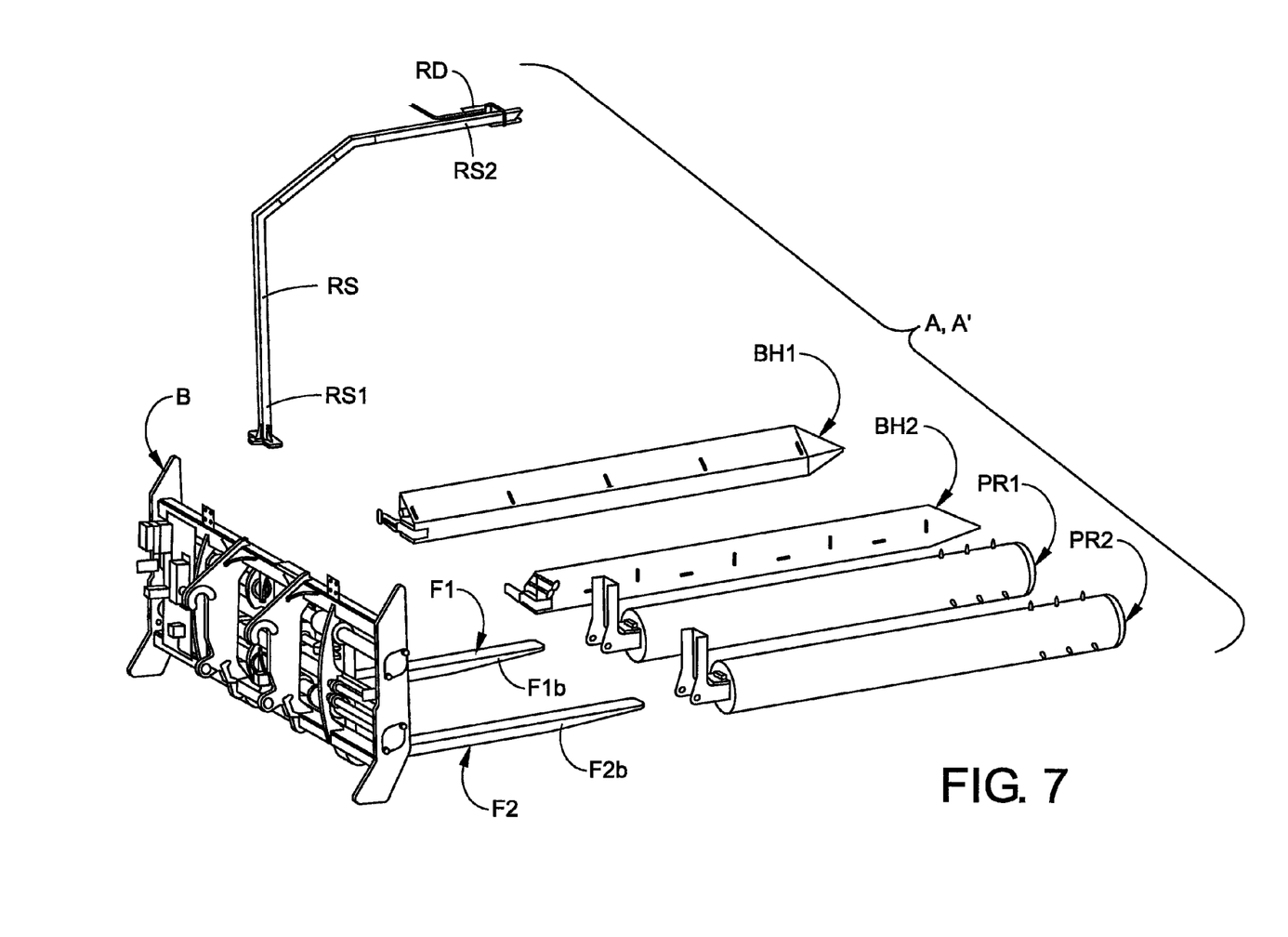
FIG. 7 is an exploded view showing the fork apparatus including the first and second powered roller devices or the optional first and second bale handling sleeves, along with an optional RFID reader device.

FIG. 7 is an exploded view showing the fork apparatus including the first and second powered roller devices or the optional first and second bale handling sleeves, along with an optional RFID reader device. The optional RFID transceiver RD is shown connected to a support RS that includes a first end RS1 connected to the body B and a second end RS2 to which the RFID transceiver RD is connected so as to be positioned above or otherwise adjacent a cotton bale supported on the powered roller devices PR1,PR2 or sleeves BJ1,BH2 for reading an RFID tag associated with the cotton bale.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A fork apparatus comprising:
   a body comprising a pair of ribs adapted to releasably mate with a quick-coupler of an associated loader machine for operably connecting the body to the associated loader machine;
   first and second forks including respective first and second fork mounting portions connected to the body and respective first and second fork working portions that project outwardly away from the body, wherein both said first and second forks are selectively movable laterally inward and outward relative to said body and relative to each other;
   said body comprising a first set of upper and lower fork rods that are arranged parallel to each other, wherein said first fork mounting portion is slidably connected to the first set of upper and lower fork rods;
   said body further comprising a second set of upper and lower fork rods that are arranged parallel to each other, wherein said second fork mounting portion is slidably connected to the second set of upper and lower fork rods;
   first and second hydraulic fork actuators respectively operably connected between the body and the first and second forks and adapted for selectively moving said first and second forks laterally relative to said body and relative to each other on said first and second sets of upper and lower parallel fork rods, respectively;
   a first powered roller device connected to said first fork and including a first roller that rotates about a first working portion axis;
   a first roller actuator that selectively rotates the first roller about the first working portion axis;
   a second powered roller device connected to said second fork and including a second roller that rotates about a second working portion axis that is parallel to the first working portion axis;
   a second roller actuator that selectively rotates the second roller about the second working portion axis;
   an emergency stop switch connected to said body and operably connected to said first powered roller device to selectively disable said first powered roller device;
   wherein said first and second powered roller devices each comprise a plurality of studs connected respectively to said first and second rollers and that are selectively movable between an extended position where said studs project outwardly from an outer roller surface and a retracted position where said studs are retracted relative to said outer roller surface;
   said first powered roller device comprising a first sleeve releasably mounted on the first fork, wherein said first roller and said first roller actuator are connected to the first sleeve and are selectively separable from said first fork by separation of said first sleeve from said first fork;
   said second powered roller device comprising a second sleeve releasably mounted on the second fork, wherein said second roller and said second roller actuator are connected to the second sleeve and are selectively separable from said second fork by separation of said second sleeve from said second fork.

2. The fork apparatus as set forth in claim 1, further comprising an RFID reader connected to said body and adapted to receive RFID data from an associated RFID tag connected to a load being carried on said first and second forks.

* * * * *